(12) United States Patent
Iio et al.

(10) Patent No.: US 6,676,165 B2
(45) Date of Patent: Jan. 13, 2004

(54) TANK JOINT PARTS AND A PROCESS FOR MANUFACTURING AN ANNULAR MOLDED PRODUCT OF RESINS

(75) Inventors: Shinji Iio, Komaki (JP); Hiroaki Ito, Kasugai (JP); Atsuo Miyajima, Inuyama (JP); Tomohide Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/096,837

(22) Filed: Mar. 14, 2002

(65) Prior Publication Data

US 2002/0167163 A1 Nov. 14, 2002

(30) Foreign Application Priority Data

Mar. 16, 2001 (JP) ........................................ 2001-075323
Jan. 23, 2002 (JP) ........................................ 2002-013734

(51) Int. Cl.⁷ ................................................ F16L 47/02
(52) U.S. Cl. ................ 285/21.1; 285/285.1; 285/288.1; 285/21.2; 285/136.1
(58) Field of Search ................................ 285/21.1, 21.2, 285/21.3, 285.1, 288.1, 919, 136.1, 423

(56) References Cited

U.S. PATENT DOCUMENTS

| | | | |
|---|---|---|---|
| 5,139,043 A | * 8/1992 | Hyde et al. ........... 137/43 |
| 5,173,234 A | 12/1992 | Figuereo | |
| 5,404,907 A | * 4/1995 | Benjey et al. ........... 137/587 |
| 5,443,098 A | 8/1995 | Kertesz | |
| 5,951,059 A | * 9/1999 | Kitamura ........... 285/24 |
| 5,975,116 A | * 11/1999 | Rosas et al. ........... 137/315.11 |
| 6,019,348 A | 2/2000 | Powell | |
| 6,305,568 B1 | * 10/2001 | Suzuki et al. ........... 220/562 |
| 6,357,618 B1 | * 3/2002 | Kloess et al. ........... 220/562 |
| 6,408,867 B2 | * 6/2002 | Aoki et al. ........... 137/202 |
| 6,428,584 B1 | * 8/2002 | Debe et al. ........... 29/623.1 |
| 6,462,122 B1 | * 10/2002 | Qian et al. ........... 524/445 |
| 6,488,877 B1 | * 12/2002 | Amburgey et al. ........... 264/219 |
| 6,557,595 B2 | * 5/2003 | Ozaki ........... 141/301 |

FOREIGN PATENT DOCUMENTS

| | | |
|---|---|---|
| DE | 195 35 413 | 10/1986 |
| DE | 39 43 328 | 7/1990 |
| DE | 195 35 413 | 10/1996 |
| EP | 0 807 659 | 11/1997 |
| EP | 0 995 591 | 4/2000 |
| JP | 06-270701 | 9/1994 |

OTHER PUBLICATIONS

XP-002203874, JP 10 279752, Oct. 20, 1998.

* cited by examiner

*Primary Examiner*—Lynne H. Browne
*Assistant Examiner*—James M. Hewitt
(74) *Attorney, Agent, or Firm*—Jacobson Holman PLLC

(57) ABSTRACT

A tank joint part has a welding member welded to the outer surface of a fuel tank and a main body formed of a material of low fuel permeability and welded or otherwise joined to the welding member. The welding member is formed of modified polyethylene, which is easily weldable or otherwise joinable to the outer surface of the fuel tank and the main body, and in which very fine particles of a layered mineral are easily dispersible. The mineral is dispersed in layers oriented substantially at right angles to the direction of any possible permeation from the tank joint part. The tank joint part ensures a low fuel permeability and a high bonding strength.

20 Claims, 3 Drawing Sheets

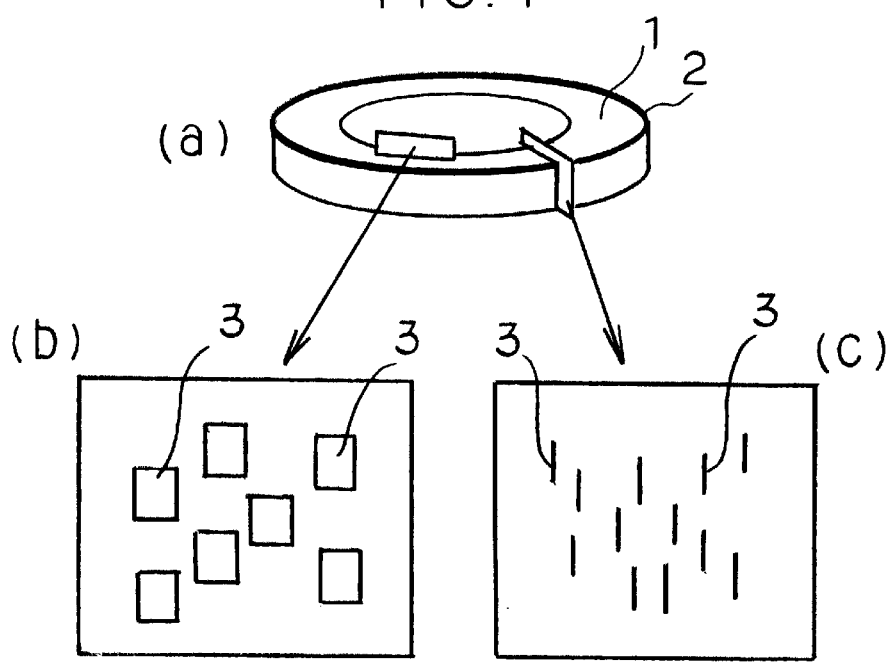
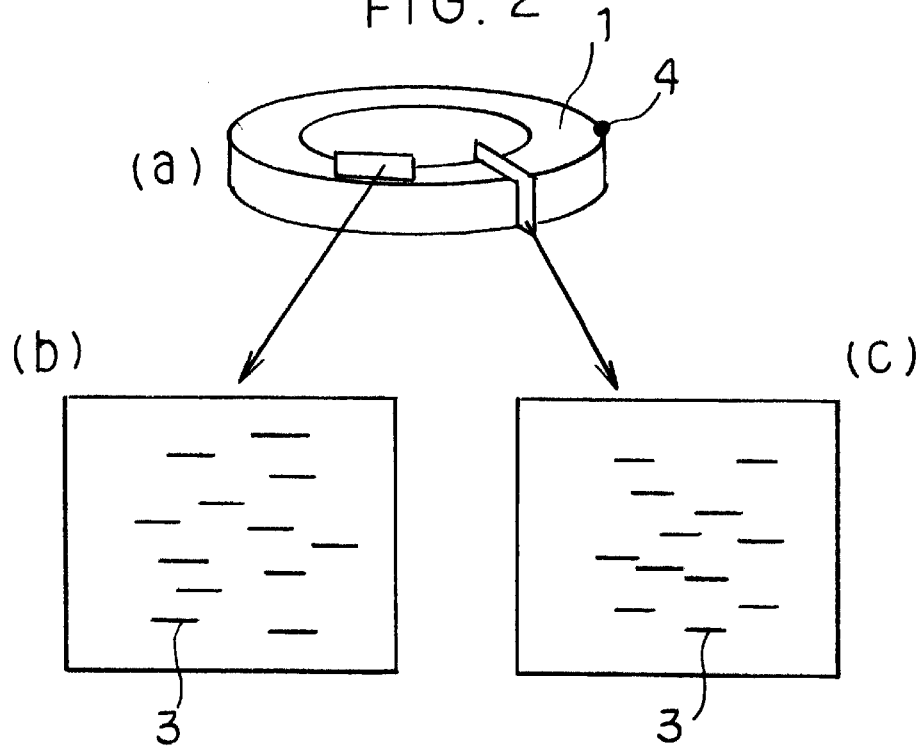

TANK JOINT PARTS AND A PROCESS FOR MANUFACTURING AN ANNULAR MOLDED PRODUCT OF RESINS

BACKGROUND OF THE INVENTION

1. Field of the Invention

This invention relates to a tank joint part and a process for manufacturing an annular molded product of resins. More particularly, it relates to any of tank joint parts attached to a fuel tank for connecting a fuel hose or the like to the fuel tank. The tank joint part may be in the form of, for example, a pipe or valve. This invention relates also to a process for manufacturing an annular molded product of a resin containing nano-layered mineral oriented substantially at right angles to its radius.

2. Description of the Related Art

The integration of automotive parts has been promoted. For example, there has been an increase of cases in which devices made of a resin, such as filler valves and onboard refueling vapor recovery (ORVR) valves, are attached to an automobile fuel tank made of a resin for joining fuel hoses to it. An automobile fuel tank often has a multilayer wall including a layer formed of a material of low fuel permeability, such as an ethylene-vinyl alcohol copolymer (EVOH), to cope with the recent gasoline evaporative emission regulations. It often has an outer surface layer formed of high-density polyethylene (HDPE) for water resistance and economical reasons.

A fuel filler valve is usually made of polyamide 12 reinforced with glass fiber (PA12GF) because of its low fuel permeability. Such a valve is, however, very low in weldability to the outer surface layer of HDPE of the fuel tank. A welding member is, therefore, interposed between the outer surface layer of the tank and the filler valve. The welding member is usually of modified polyethylene which is easily weldable to both of HDPE and PA12 GF. Such related art is disclosed in Japanese Patent No. 2,715,870. German Patent DE 195 35 413 C1 discloses a multilayer welding member of HDPE, or modified HDPE.

A polyethylene resin, such as modified polyethylene, HDPE or modified HDPE, is, however, of high fuel permeability. A welding member of such a resin material gives a tank joint part of higher fuel permeability which may cancel the advantage of a fuel tank having a wall layer of a material of low fuel permeability as stated above, and make it fail to satisfy the evaporative emission regulations which are particularly strict in the United States.

SUMMARY OF THE INVENTION

It is an object of this invention to overcome the drawbacks of the related art as stated above.

Modified polyethylene is easily weldable to both the outer surface of a fuel tank and the main body of a tank joint part, as stated. Moreover, the inventors of this invention have found that modified polyethylene is a material in which layers of a nano-layered mineral are easily dispersible, particularly when polymer intercalation is employed, among resins expected to exhibit good weldability or joinability.

It is generally said that a nano-composite prepared from a resin and a nano-layered mineral gives a molten resin which is low in fluidity (and in moldability) if its mineral content is high. Modified polyethylene is, however, a material in which such a mineral can be easily dispersed. Moreover, it has been found that the specifically controlled orientation of such a mineral in the modified polyethylene lowers its fuel permeability dramatically, even if the proportion of the mineral may be so small as not to affect the fluidity or moldability of the molten resin.

According to a first aspect of this invention, there is provided a tank joint part for connecting a device to a fuel tank having an outer surface formed of a resin, the joint part comprising a welding member formed from a resin and welded to the outer surface of the tank and a main body formed of a resin and welded or otherwise joined to the welding member, the resin of the welding member being modified polyethylene in which a nano-layered mineral is dispersed in layers.

The welding member of modified polyethylene is easily weldable to the outer surface of a fuel tank formed of, for example, HDPE and is also easily weldable or otherwise joinable to the main body of the tank joint part formed from, for example, glass fiber-reinforced polyamide 12. Because the nano-layered mineral can be satisfactorily dispersed in modified polyethylene, the fuel impermeability of the welding member is greatly improved due to barrier of nano-layered mineral against fuel. The proportion of the mineral can be small enough to ensure the fluidity (and moldability) of the molten modified polyethylene used to mold the tank joint part. Moreover, the welding member hardly swells in volume with fuel, so that hardly any cracking or fracture occurs between the welding member and the main body of the joint part, or between the welding member and the outer surface of the fuel tank. Incidentally, HDPE can be added to the modified polyethylene containing a nano-layered mineral dispersed therein to the extent not affecting the action of the mineral.

According to a second aspect of this invention, the nano-layered mineral are oriented substantially at right angles to the direction of any possible permeation of fuel from the welding member. Such orientation enables the mineral to produce the best result in preventing the permeation of fuel from the welding member and thereby bring about a drastic lowering in the fuel permeability of the modified polyethylene, so that it is possible to lower the proportion of the mineral to a still further extent and ensure the still higher fluidity or moldability of the molten resin which is used to make the tank joint part.

According to a third aspect of this invention, the mineral occupies a proportion of 2 to 10% by weight in the modified polyethylene of the first and second aspects. The mineral proportion as stated is preferred for achieving a particularly good result in lowering the fuel permeability of the modified polyethylene, while ensuring the satisfactory fluidity or moldability of the molten resin when molding the tank joint part. If the mineral proportion is lower than 2% by weight, it may be impossible to lower the fuel permeability of the modified polyethylene satisfactorily. If it exceeds 10% by weight, satisfactory fluidity or moldability of the molten modified polyethylene may not be attained in molding the tank joint part. A still more preferable mineral proportion is from 2 to 5% by weight.

According to a fourth aspect of this invention, the modified polyethylene of the first to third aspects is of the carboxylic acid-modified, carboxylic anhydride-modified, or base-modified type. Any such type of polyethylene is excellent especially in weldability to the outer surface of the fuel tank and the main body of the tank joint part and in dispersibility of the mineral.

According to a fifth aspect of this invention, the resin of the main body of the first to fourth aspects is an alloy of a resin of low fuel permeability and a polyolefin elastomer, or the tank joint part includes an intermediate member formed of such an alloy and interposed between its main body and welding member. The alloy is such a material that when swelling with fuel, its swelling may not differ by any more than 10% from that of HDPE forming the outer surface of the fuel tank or that of modified polyethylene, while it shows a high welding strength of, say, at least 2 MPa when it is welded to either, so that hardly any cracking or fracture may occur at the welded portion of the main body.

According to a sixth aspect of this invention, the resin in the alloy of the fifth aspect is preferably a polyphenylene sulfide (PPS), polyester, polyacetal (POM) or polyamide (PA) resin, or an ethylene-vinyl alcohol copolymer (EVOH).

According to a seventh aspect of this invention, the resin of the main body of the first to sixth aspects, or of the main body and the intermediate member contains layers of a nano-layered mineral dispersed therein, so that the fuel permeability of the main body (and the intermediate member) can be still more lowered.

According to an eighth aspect of this invention, the welding member and the main body are a product of two-color molding, or the welding member, intermediate member and main body are a product of multi-color molding. Two-color molding is a method in which two kinds of molten resins are injected from separate injection nozzles into a mold successively or simultaneously to make a resinous product composed of two portions or members. Multi-color molding is a method in which three or more kinds of molten resins are likewise injected into a mold to make a resinous product composed of three or more portions or members. As a product of two-color or multi-color molding generally has a high bonding strength at the bonded portions, the joint part according to this invention has an improved bonding strength between the welding member and main body, between the welding and the intermediate members, and between the intermediate member and main body. A broader range of materials can, therefore, be employed to make a product which is satisfactory in bonding strength.

According to a ninth aspect of this invention, there is provided a process for manufacturing an annular molded resin product, wherein the process comprises injecting a molten resin containing a nano-layered mineral dispersed therein in layers into an annular mold cavity through a film gate formed at its top along its whole circumference. The process makes it possible to manufacture easily and effectively an annular molded resin product containing mineral layers oriented substantially at right angles to its radius. The process or its advantages will be described in detail based on FIG. 1. FIG. 1 shows at (a) an annular molded resin product 1 made by the injection molding of a molten resin containing a nano-layered mineral through a film gate 2 formed at the top of an annular mold cavity along its whole circumference. The molten resin flows down along the whole circumference of the annular mold cavity and the molded product 1, therefore, contains the mineral 3 oriented substantially at right angles to its radius, as shown in FIG. 1 at (b) or (c) On the other hand, FIG. 2 shows at (a) an annular molded product 1 made by the injection molding of a molten resin containing a nano-layered mineral through a one-point gate 4 formed at the top of an annular mold cavity. The molten resin flows horizontally along the annular mold cavity and the mineral 3 in the molded product is oriented as shown in FIG. 2 at (b) or (c) and fails to be oriented substantially at right angles to its radius.

According to a tenth aspect of this invention, there is provided a process for manufacturing an annular molded resin product, which comprises the steps of extruding a molten resin containing a nano-layered mineral dispersed in layers into a cylindrical molded product; and cutting an annular molded product having a required thickness from the cylindrical molded product. The process likewise makes it possible to manufacture easily and effectively an annular molded product containing mineral layers oriented substantially at right angles to its radius. The cylindrical molded product contains the mineral layers oriented along its wall in the direction of its extrusion, and the annular resin product made by cutting it, therefore, contains the mineral layers oriented substantially at right angles to its radius.

The above and other features and advantages of this invention will become apparent from the following description and the accompanying drawings.

BRIEF DESCRIPTION OF THE DRAWINGS

FIG. 1 is a perspective view for illustrating a molding process embodying this invention and employing a film gate for injection;

FIG. 2 is a perspective view for illustrating a molding process employing a one-point gate;

DETAILED DESCRIPTION OF THE INVENTION

Fuel Tank

The fuel tank in this invention is a tank having a single-layer wall of a resin, or a multilayer wall including at least an outer surface layer of a resin (for example, HDPE) The fuel tank is typically a gasoline tank for an automobile, though it may also be used for a different kind of fuel for a different purpose. A fuel hose is a typical device connected to a fuel tank by a tank joint part according to this invention, though an onboard refueling vapor recovery (ORVR) hose, a filler hose or the like may also be connected.

Tank Joint Part

The tank joint part is a device welded to a fuel tank in order to connect another part to it. It is usually an annular or cylindrical molded product of a resin having various cross-sectional shapes. Examples of the tank joint parts are fuel filler and ORVR valves, but are not limited to valve type parts. Pipes for connecting hoses are applicable, too. Such a tank joint part can be welded to a fuel tank by any appropriate methods, but preferably by heating plate, vibration, ultrasonic or laser welding. A hot gas, resistance, spin, infrared or induction welding may also be employed.

The tank joint part includes a welding member formed of a resin and welded to the outer surface of a fuel tank and a main body formed from a resin and welded or otherwise joined to the welding member. If the tank joint part is annular or cylindrical, its welding member and main body are usually an annular or cylindrical molded product.

Figure 3:
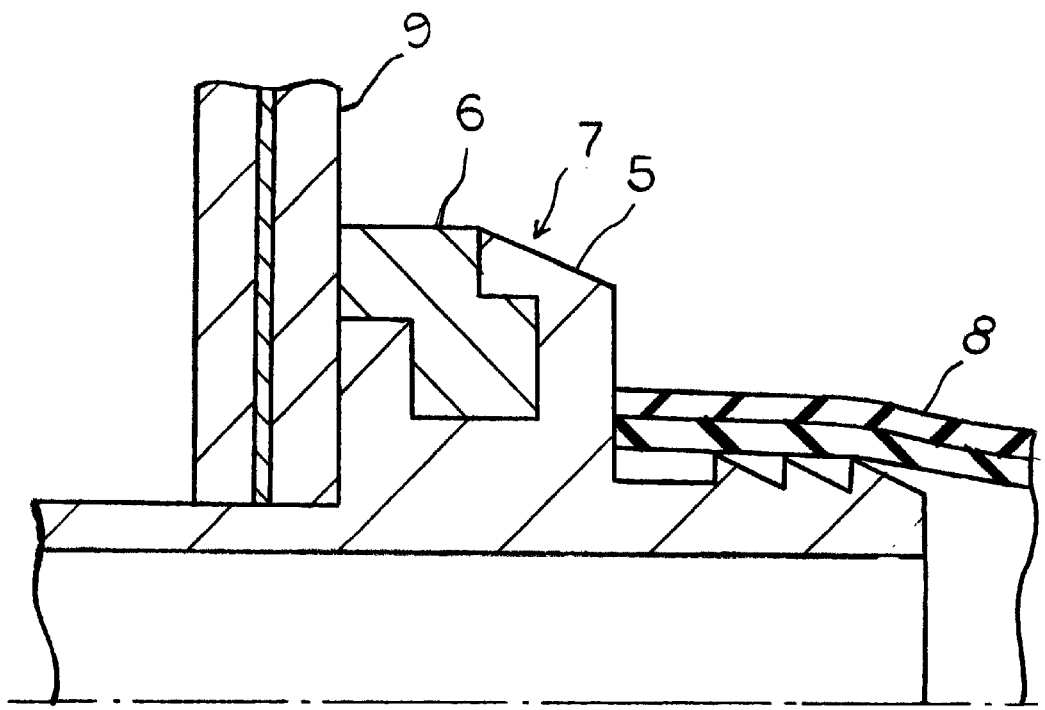
FIG. 3 is a cross-sectional view of a part of a tank joint part embodying this invention and mounted in its working position.

The main body and the welding member can be prepared separately from each other and united into a unitary structure by, for example, bonding with an adhesive after or without surface treatment. They are preferably may also be made together as a unitary structure by two-color molding. If there is any intermediate member between the main body and the welding member, they are preferably formed together as a unitary structure by multi-color molding. Moreover, the main body 5 and the welding member 6 are preferably so formed by two-color molding as to have a mutually interlocking relation as shown in FIG. 3, so that they may have a higher bonding strength therebetween. According to FIG. 3, the main body 5 and the welding member 6 form a tank joint part 7 welded by its welding member 6 to a fuel tank 9 for connecting a fuel hose 8 to the fuel tank 9.

Welding Member

The welding member is formed of modified polyethylene containing very fine layers of a nano-layered mineral dispersed therein. Though the modified polyethylene is not limited, the type which is modified with carboxylic acid or anhydride is preferable. Polyethylene modified with a base, such as amine, is also preferred. Amine-modified polyethylene can be obtained by, for example, adding a monomer having an amino group for polymerization, or modifying the carboxyl group, if any, of modified polyethylene with an amino group. Modified polyethylene having a specific gravity of 0.91 to 0.97 is usually employed, and one having a specific gravity of 0.93 or higher is preferred for its low fuel permeability.

The mineral dispersed in the modified polyethylene is not limited, but preferably it should be fine and have a high aspect ratio. Typical examples of the materials include layered clay minerals of the smectite group such as montmorillonite, beidellite, saponite, nontronite, hectorite, sauconite and stevensite, and mica as well. Montmorillonite and mica are, among others, preferred. For the dispersion of a nano-layered mineral in layers, it is ideally essential for all of the mineral layers to be separated from one another mutually spacing at nanometer level. However, the majority of the nano-layered mineral may be dispersed separately from one another or in groups of up to several layers each.

The dispersion of a nano-layered mineral in layers in modified polyethylene may be effected by one of these two methods:

(a) if metal ions are present between mineral layers, the mineral is caused to swell with water, and mixed with modified polyethylene in a molten state; and (b) the metal ions present between mineral layers may be exchanged with alkyl ammonium ions. After ion exchange, polymerization after monomer intercalation, or preferably polymer intercalation is effected in the presence of the mineral. Polymerization after monomer intercalation may be carried out by polymerizing the monomers for modified polyethylene between the mineral layers in the presence of an olefinic polymerization catalyst to produce a polymer in which the mineral layers are dispersed. Polymer intercalation may be carried out by (1) mixing the mineral after ion exchange with modified polyethylene in a molten state, (2) dispersing the mineral in modified polyethylene of low viscosity having a melt flow rate of at least 0.5 g/10 min., or preferably at least 3 g/10 min., and mixing it with modified polyethylene of higher viscosity in a molten state, or (3) causing the mineral to swell with an organic solvent, such as xylene or toluene, and mixing it with modified polyethylene in a molten state.

Any of primary to quaternary alkyl ammonium ions can be used for exchange with the metal ions present between the mineral layers, though quaternary alkyl ammonium ions are preferred. Specific examples of the alkyl ammonium ions include tetrabutylammonium, tetrahexylammonium, dihexyldimethylammonium, dioctyldimethyl-ammonium, hexatrimethylammonium, octatrimethylammonium, dodecyltrimethylammonium, hexadecyltrimethylammonium, stearyltrimethylammonium, docosenyltrimethylammonium, cetyltrimethylammonium, cetyltriethylammonium, hexadecylammonium, tetradecyldimethylbenzylammonium, stearyldimethylbenzylammonium, dioleyldimethylammonium, N-methyldiethanollaurylammonium, dipropanolmonomethyllaurylammonium, dimethylmonoethanollaurylammonium and polyoxyethylenedodecylmonomethylammonium ions, and a quaternary alkylaminopropylamine compound.

The mineral dispersed in the modified polyethylene is preferably oriented substantially at right angles to the direction of any possible fuel permeation from the welding member to produce the best result in preventing any such fuel permeation. If the tank joint part (or its welding member) is annular, fuel is usually likely to permeate radially therethrough. The process according to the ninth or tenth aspect, therefore, enables the mineral to be oriented substantially at right angles to the radius of the annular product.

The proportion of the mineral in the modified polyethylene is preferably from 2 to 10% by weight as long as the mineral is oriented substantially at right angles to the direction of any possible fuel permeation from the welding member. A range of 2 to 5% by weight is more preferable.

Main Body

The main body of the tank joint part is welded or otherwise joined to its welding member welded to the outer surface of a fuel tank. The main body may be a single member, or may be accompanied by an intermediate member. If the latter is the case, the intermediate member is disposed between the welding member and the main body, and welded or otherwise joined thereto.

The main body may be of any material, such as glass fiber-reinforced PA 12, but is preferably of an alloy of a resin of low fuel permeability and a polyolefin elastomer. Alternatively, the main body is preferably accompanied by an intermediate member formed of such an alloy.

PPS, polyester, POM, PA or EVOH is a preferred resin of low fuel permeability. A preferred PPS is of the linear type. A preferred polyester resin is polybutylene terephthalate, poly-1,4-cyclohexanedimethylene terephthalate, polytrimethylene terephthalate, or polybutylene naphthalate. A thermoplastic elastomer containing such a polyester resin as a hard segment is also a preferred resin. A preferred POM may be a homopolymer, or copolymer. A preferred PA is PA6, PA66, PA612, PA610, PA11, PA12, PA6T or PA9T. A copolymer of any such PA monomers, or a mixture of any such PA and copolymer is also a good material. Moreover, PA having an amino content of at least $4 \times 10^{-5}$ gram-equivalent per gram is also a good material for its high bonding strength with the welding member. A preferred EVOH has an ethylene proportion of 25 to 45 mols.

If the alloy is of a PPS resin and a polyolefin elastomer, it preferably has an elastomer proportion of 10 to 150 parts by weight relative to 100 parts by weight of resin. An alloy containing a polyester resin instead of the PPS preferably has an elastomer proportion of 10 to 130 parts by weight relative to 100 parts by weight of resin. An alloy containing a POM resin preferably has an elastomer proportion of 10 to 100 parts by weight relative to 100 parts by weight of resin. An alloy containing PA preferably has an elastomer proportion of 10 to 130 parts by weight relative to 100 parts by weight of resin. An alloy containing EVOH preferably has an elastomer proportion of 10 to 120 parts by weight relative to 100 parts by weight of resin.

The polyolefin elastomer is preferably an olefin polymer containing at least one kind of functional group selected from among an epoxy, acid anhydride or carboxyl group, a salt of a carboxyl group, and a carboxylic acid ester. It may further contain an olefin elastomer not containing any such functional group, such as an ethylene-propylene, ethylene-butene, ethylene-propylene-diene, styrene-butadiene, or butene-isoprene copolymer.

The main body, or the main body and the intermediate member preferably contain a nano-layered mineral dispersed in layers therein to attain lower fuel permeability. As regards the preferred mineral, orientation, molding process, or proportion, see the relevant description already made in connection with the welding member. Moreover, the main body, or the main body and the intermediate member preferably contain glass fibers to the extent not affecting the fluidity or moldability of the molten resin seriously, or contain both a nano-layered mineral in layers and glass fibers.

Molding Process

The main body (including an intermediate member, if any) and the welding member can be prepared separately from each other and united into a unitary structure by, for example, bonding with an adhesive after or without surface treatment. They are preferably made together as a unitary structure by two-color (or multi-color) molding. Moreover, they are preferably so formed by two-color (or multi-color) molding as to have a mutually interlocking relation to exhibit a higher bonding strength therebetween.

The process according to the ninth or tenth is preferably employed for manufacturing a tank joint part having a main body, an intermediate member if any, and a welding member which are annular or cylindrical. The term "annular molded product" as herein used not only means an exactly ring-shaped product, but also includes a cylindrical product like a pipe. Though the product typically includes an annular or cylindrical tank joint part, and its main body, intermediate member or welding member, it may also cover any other appropriate device, part or member.

DESCRIPTION OF THE PREFERRED EMBODIMENTS

Preparation of Tank Joint Parts for Evaluation

Tank joint parts for testing purposes were prepared in accordance with Examples 1 to 13 embodying this invention and Comparative Examples 1 to 3 as shown in Tables 1 and 2 below.

TABLE 1

|  | Example | | | | | | Comparative Example | |
|---|---|---|---|---|---|---|---|---|
|  | 1 | 2 | 3 | 4 | 5 | 6 | 1 | 2 |
| Montmorillonite | 2 | 5 | 10 |  |  |  | 2 | 2 |
| Mica |  |  |  | 5 |  |  |  |  |
| Hectorite |  |  |  |  | 5 |  |  |  |
| Fuel permeability (mg/day) | 31 | 27 | 20 | 21 | 32 | 30 | 40 | 37 |

TABLE 2

|  | Example | | | | | | | Comparative Example |
|---|---|---|---|---|---|---|---|---|
|  | 7 | 8 | 9 | 10 | 11 | 12 | 13 | 3 |
| Montmorillonite | 5 | 5 | 5 | 5 | 5 | 5 | 5 | 5 |
| Fuel permeability (mg/day) | 15 | 20 | 15 | 18 | 23 | 25 | 16 | 61 |

Figure 4A:
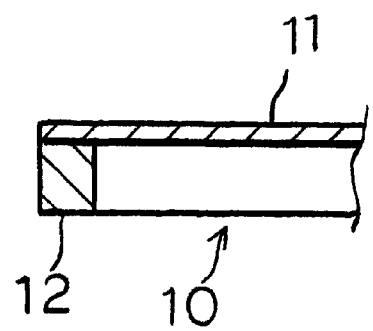
FIG. 4A is a sectional view of a part of a test tank joint part embodying this invention.

FIG. 4A is a side elevational and sectional view of about a half of each tank joint part. Each joint part 10 has a circular top portion (or main body) 11 having a radius of 20 mm and a thickness of 0.5 mm and a flange (or welding member) 12 depending from the edge of the top portion 11 and having a height of 5 mm and a wall thickness of 5 mm.

The device according to Example 1 had its top portion formed of glass fiber-reinforced PA 12 containing 30% by weight of glass fibers. Its flange was formed by the process according to the ninth aspect of this invention from maleic anhydride-modified polyethylene containing 2% by weight of montmorillonite dispersed in layers therein by polymer intercalation.

The device according to Example 2 was made by employing maleic anhydride-modified polyethylene containing 5% by weight of montmorillonite and otherwise repeating Example 1. The device according to Example 3 was made by employing maleic anhydride-modified polyethylene containing 10% by weight of montmorillonite and otherwise repeating Example 1. The device according to Example 4 was made by dispersing mica in maleic anhydride-modified polyethylene and otherwise repeating Example 2. The device according to Example 5 was made by dispersing hectorite in maleic anhydride-modified polyethylene and otherwise repeating Example 2. The device according to Example 6 was made by forming its flange by the process according to the tenth aspect of this invention, forming its top portion by two-color molding with its flange and otherwise repeating Example 1.

The device according to Comparative Example 1 was made by repeating Example 1, but without adding any nano-layered mineral to maleic anhydride-modified polyethylene. The device according to Comparative Example 2 was made by forming its flange by injection molding through a one-point gate as shown in FIG. 2 and otherwise repeating Example 1.

The device according to Example 7 was made by forming its top portion of an alloy of a polyester and a polyolefin elastomer containing 30% by weight of glass fibers and otherwise repeating Example 2. The device according to Example 8 was made by forming its top portion of an alloy of a POM resin and a polyolefin elastomer and otherwise repeating Example 2. The device according to Example 9 was made by forming its top portion of an alloy of a PPS resin and a polyolefin elastomer containing 30% by weight of glass fibers and otherwise repeating Example 2. The device according to Example 10 was made by forming its top portion of EVOH and otherwise repeating Example 2. The device according to Example 11 was made by forming its top portion of a PA-6 resin containing 30% by weight of glass fibers and otherwise repeating Example 2. The device according to Example 12 was made by forming its top portion of a PA-12 resin containing 2% by weight of montmorillonite dispersed in layers therein and otherwise repeating Example 2. The device according to Example 13 was made by forming its top portion of the same material as in Example 7 and its flange from an amine-modified polyethylene containing 5% by weight of montmorillonite dispersed in layers therein by polymer intercalation and otherwise repeating Example 1. The device according to Comparative Example 3 had both of its top portion and flange formed of HDPE.

Preparation of Test Assemblies

Figure 4B:
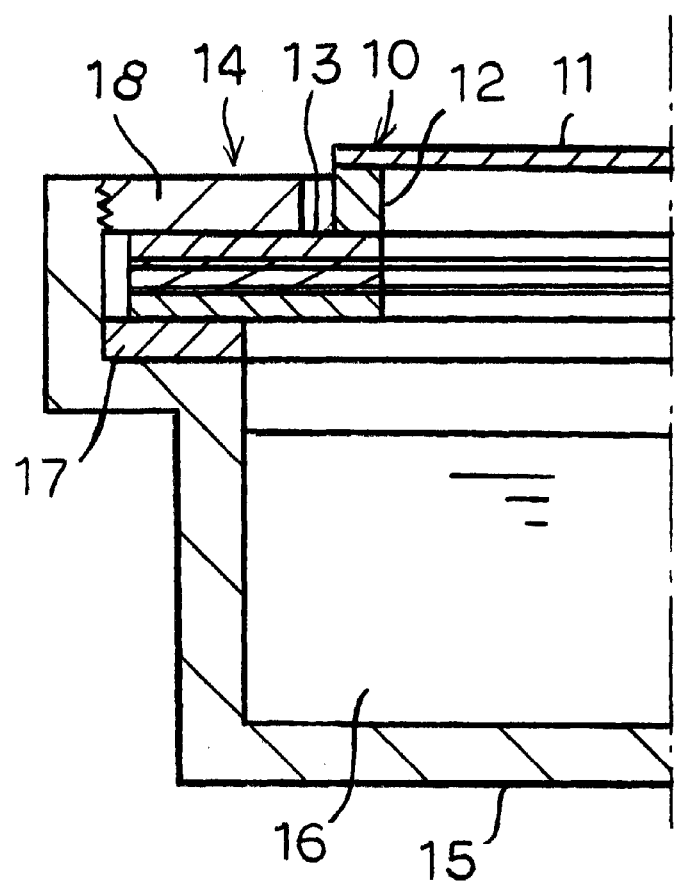
FIG. 4B is a sectional view of a test assembly including a tank joint part embodying this invention, and connected to a testing apparatus.

Each of the tank joint parts according to Examples 1 to 13 and Comparative Examples 1 to 3 was used to prepare a test assembly. Each tank joint part 10 had its flange 12 welded at its bottom to a sheet material 13 for a tank by a hot-plate welding method to prepare a test assembly 14, as shown in FIG. 4B. The sheet material 13 was a flat and annular multilayer structure having an inside diameter equal to that of the flange 12. Its multilayer structure was similar to the resinous wall of a fuel tank, and was made by applying an adhesive resin onto both sides of an EVOH layer, laying HDPE thereon and pressing them together under heat. The flange 12 was welded at its bottom to one of the HDPE layers of the sheet material 13.

Evaluation of Test Assemblies

Each test assembly was tested for fuel permeability by a method as shown in FIG. 4B. A test cup 15 having a top opening and a shoulder was fed with a fuel mixture 16 prepared by mixing 90 volume % of Fuel C, or test gasoline composed of equal proportions of toluene and isooctane and 10 volume % of ethanol. A rubber seal 17 was placed on the shoulder of the cup 15 and the test assembly 14 was placed on the seal 17. An annular cover 18 having a screw thread was threadedly fitted in the top opening of the cup 15 to tighten the test assembly 14 and thereby close the cup 15 tightly. The cup 15 was turned upside down, and held in an atmosphere having a temperature of 40° C., and its change in weight including its contents was checked every day for a month as a measure for the fuel permeability of the test assembly. The measured values when they were stable were used for evaluation. The results are shown as Fuel permeability (mg/day) in Table 1 or 2.

While the preferred embodiments have been described, variations thereto will occur to those skilled in the art within the scope of the present inventive concepts which are delineated by the following claims.

What is claimed is:

1. A tank joint part for connecting a device to a fuel tank, which comprises a welding member formed of a resin and welded to a resinous outer surface of the tank and a main body formed of a resin and welded or otherwise joined to the welding member, the resin of the welding member being modified polyethylene in which a nano-layered mineral is dispersed in layers.

2. The tank joint part according to claim 1, wherein the tank joint part is a fuel filler valve, an onboard refueling vapor recovery valve or a pipe for connecting a fuel hose.

3. The tank joint part according to claim 1, wherein the welding member is welded to the tank by a method selected from the group consisting of hot plate, vibration, ultrasonic, laser, hot gas, resistance, spin, infrared and induction welding.

4. The tank joint part according to claim 1, wherein the nano-layered mineral occupies a proportion of 2 to 10% by weight in the polyethylene.

5. The tank joint part according to claim 1, wherein the nano-layered mineral is composed of very fine layers having a high aspect ratio.

6. The tank joint part according to claim 1, wherein the nano-layered mineral is selected from the group consisting of montmorillonite, beidellite, saponite, nontronite, hectorite, sauconite, stevensite and mica.

7. The tank joint part according to claim 1, wherein the nano-layered mineral contains metal ions between its layers and is dispersed by mixing with the modified polyethylene in a molten state after swelling with water.

8. The tank joint part according to claim 1, wherein the nano-layered mineral contains metal ions between its layers and is dispersed in the modified polyethylene by polymer intercalation or polymerization after monomer intercalation after the metal ions have been exchanged with alkyl ammonium ions.

9. The tank joint part according to claim 1, wherein the nano-layered mineral layers are separate from one another, or the majority thereof are separate from one another or form groups each consisting of at most several layers.

10. The tank joint part according to claim 1, wherein the modified polyethylene is carboxylic acid-modified, carboxylic anhydride-modified or base-modified polyethylenes.

11. The tank joint part according to claim 10, wherein the base-modified polyethylene is an amine-modified polyethylene obtained by adding a monomer having an amino group for polymerization, or by modifying the carboxyl group of polyethylene with an amino group.

12. The tank joint part according to claim 1, wherein the main body is formed of an alloy of a resin of low fuel permeability and a polyolefin elastomer, or is accompanied by an intermediate member formed of the alloy.

13. The tank joint part according to claim 12, wherein the resin of low fuel permeability is selected from the group consisting of polyphenylene sulfide, polyester, polyacetal, polyamide and ethylene-vinyl alcohol copolymer resins.

14. The tank joint part according to claim 12, wherein the elastomer is an olefin polymer containing at least one kind of functional group selected from the group consisting of epoxy, acid anhydride and carboxyl groups, a salt of a carboxyl group and a carboxylic acid ester.

15. The tank joint part according to claim 1, wherein the main body is formed of the resin in which a nano-layered mineral is dispersed in layers.

16. The tank joint part according to claim 15, further comprising an intermediate member formed between the main body and the welding member, and made of the resin of the main body.

17. The tank joint part according to claim 16, wherein the main body and the welding member are a product of two-color molding, or the main body, intermediate member and welding member are a product of multi-color molding.

18. The tank joint part according to claim 17, wherein the main body and welding member, or the main body, intermediate member and welding member have a mutually complementary relation in profile.

19. A process for manufacturing an annular molded resin product, which comprises injecting a molten resin containing a nano-layered mineral dispersed therein in layers, into an annular mold cavity through a film gate formed at its top along its whole circumference.

20. A process for manufacturing an annular molded resin product, which comprises extruding a molten resin containing a nano-layered mineral dispersed therein in layers into a cylindrical molded product; and cutting the cylindrical molded product into an annular molded product having a required thickness.

* * * * *

UNITED STATES PATENT AND TRADEMARK OFFICE
CERTIFICATE OF CORRECTION

PATENT NO. : 6,676,165 B2
DATED : January 13, 2004
INVENTOR(S) : Shinji Iio et al.

It is certified that error appears in the above-identified patent and that said Letters Patent is hereby corrected as shown below:

Column 9,
Line 45, "A tank" should read -- A fuel tank --;
Line 51, "layers" should read -- layers, wherein the nano-layered mineral is oriented substantially at right angles to the direction of any possible fuel permeation from the welding member --.

Column 10,
Lines 55 and 56, "an annular molded resin product" should read -- a fuel tank joint part as claimed in claim 1 --;
Lines 60 and 61, "an annular molded resin product" should read -- a fuel tank joint part as claimed in claim 1 --;
Line 64, "an annular molded product" should read -- a welding member --.

Signed and Sealed this

Twenty-fifth Day of May, 2004

JON W. DUDAS
*Acting Director of the United States Patent and Trademark Office*